United States Patent
Tang et al.

(10) Patent No.: US 10,416,864 B2
(45) Date of Patent: Sep. 17, 2019

(54) METHOD AND APPARATUS FOR OPTIMIZING OPERATING ENVIRONMENT OF A USER TERMINAL THROUGH MULTIPLE USER INTERFACES

(71) Applicant: Tencent Technology (Shenzhen) Company Limited, Shenzhen (CN)

(72) Inventors: Wenliang Tang, Shenzhen (CN); Wei Li, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 764 days.

(21) Appl. No.: 14/974,592

(22) Filed: Dec. 18, 2015

(65) Prior Publication Data
US 2016/0103599 A1   Apr. 14, 2016

Related U.S. Application Data

(63) Continuation of application No. PCT/CN2014/087090, filed on Sep. 22, 2014.

(30) Foreign Application Priority Data

Nov. 21, 2013   (CN) .......................... 2013 1 0594216

(51) Int. Cl.
G06F 3/0484 (2013.01)
G06F 9/48 (2006.01)
G06F 9/50 (2006.01)

(52) U.S. Cl.
CPC ...... *G06F 3/04847* (2013.01); *G06F 3/04842* (2013.01); *G06F 9/4843* (2013.01); *G06F 9/5038* (2013.01); *Y02D 10/24* (2018.01)

(58) Field of Classification Search
CPC ............ G06F 3/04847; G06F 3/04842; G06F 9/4843; G06F 9/5038
See application file for complete search history.

(56) References Cited

U.S. PATENT DOCUMENTS 5,774,121 A * 6/1998 Stiegler ............... G06F 3/04847
   706/46
5,963,910 A * 10/1999 Ulwick .................. G06Q 10/06
   705/7.28

(Continued)

FOREIGN PATENT DOCUMENTS

| CN | 102571785 A | 7/2012 |
| EP | 2012233 A2 | 1/2009 |

OTHER PUBLICATIONS

Hillier, "Three alternatives to CCleaner: Part 1—SlimCleaner", https://davescomputertips.com/three-alternatives-to-ccleaner-part-1/, Jan. 13, 2012.*

(Continued)

*Primary Examiner* — Li P Sun
*Assistant Examiner* — Joseph R. Burwell
(74) *Attorney, Agent, or Firm* — Morgan, Lewis & Bockius LLP

(57) ABSTRACT

Method and device of improving performance of a computing device are disclosed. The method includes: scanning the computing device to generate multiple performance optimization tasks for the computing device; presenting multiple task prioritizing methods for determining relative priority of at least two of the multiple performance optimization tasks; receiving a user's selection of a first task prioritizing method from the multiple task prioritizing methods; in accordance with the first task prioritizing method, identifying a first task with a highest priority; displaying a first interface including information of the first performance optimization task and an option to start the first task; upon receiving the user's (Continued)

instruction to start the first performance optimization task, starting the first performance optimization task; and upon completion of the first performance optimization task, replacing the first interface with a second interface.

20 Claims, 7 Drawing Sheets

(56) References Cited

U.S. PATENT DOCUMENTS

| | | | | |
|---|---|---|---|---|
| 8,990,797 | B2* | 3/2015 | Schiemann | G06F 9/4406 717/174 |
| 9,280,391 | B2* | 3/2016 | Ben-Itzhak | G06F 9/4881 |
| 2004/0260956 | A1* | 12/2004 | Pagan | G06F 9/4406 713/300 |
| 2005/0015215 | A1* | 1/2005 | Zhang | G06F 9/4418 702/119 |
| 2005/0154559 | A1* | 7/2005 | Jager | G06F 11/3684 702/182 |
| 2006/0047794 | A1* | 3/2006 | Jezierski | H04L 41/0823 709/221 |
| 2006/0136988 | A1* | 6/2006 | Raja | G06F 9/5027 726/1 |
| 2006/0236085 | A1* | 10/2006 | Norton | G06F 9/4406 713/2 |
| 2008/0082812 | A1* | 4/2008 | Kirshenbaum | G06F 9/4401 713/2 |
| 2008/0201196 | A1* | 8/2008 | Rowland | G06Q 10/06311 705/7.13 |
| 2010/0153183 | A1* | 6/2010 | Ulwick | G06Q 10/0631 705/7.12 |
| 2012/0144394 | A1 | 6/2012 | Prabhakar et al. | |
| 2013/0014012 | A1* | 1/2013 | Boucher | G06Q 10/20 715/705 |
| 2013/0232331 | A1* | 9/2013 | Farhan | G06F 11/3006 713/100 |
| 2016/0036722 | A1* | 2/2016 | Obrecht | G06F 9/50 709/226 |
| 2016/0055013 | A1* | 2/2016 | Liu | G06F 9/44505 713/100 |

OTHER PUBLICATIONS

Hillier, "Three alternatives to CCleaner: Part 12—Toolwiz Care", https://davescomputertips.com/three-alternatives-to-ccleaner-part-2/, Jan. 25, 2012.*

Huang, "Getting Started with SetCPU", https://www.setcpu.com/documentation.html, 2012, as retrieved by the Wayback Machine on archive.org on Oct. 30, 2013 at https://web.archive.org/web/20131030004016/https://www.setcpu.com/documentation.html.*

Tuliani, "TuneUp Utilities 2013 Review", http://www.firstpost.com/tech/reviews/tuneup-utilities-2013-review-3722157.html, Mar. 23, 2013.*

Tencent Technology, ISRWO, PCT/CN2014/087090, Dec. 26, 2014, 6 pgs.

Tencent Technology, IPRP, PCT/CN2014/087090, May 24, 2016, 4 pgs.

* cited by examiner

METHOD AND APPARATUS FOR OPTIMIZING OPERATING ENVIRONMENT OF A USER TERMINAL THROUGH MULTIPLE USER INTERFACES

PRIORITY CLAIM AND RELATED APPLICATION

This application is a continuation application of PCT Patent Application No. PCT/CN2014/087090, entitled "METHOD AND APPARATUS FOR OPTIMIZING OPERATING ENVIRONMENT OF A USER TERMINAL" filed on Sep. 22, 2014, which claims priority to Chinese Patent Application No. 201310594216.0, entitled "METHOD AND APPARATUS FOR OPTIMIZING OPERATING ENVIRONMENT OF A TERMINAL" filed on Nov. 21, 2013, both of which are incorporated by reference in their entirety.

FIELD OF THE TECHNOLOGY

The present application relates to the field of security technologies, and in particular, to a method and apparatus for optimizing an operating environment of a terminal.

BACKGROUND OF THE TECHNOLOGY

As computing devices (e.g., computers, tablets, and smart phones) get more powerful, they are also getting more complicated. Applications and programs have been designed to help users optimize the performance of the devices. However, optimization processes have lots of subtleties and compromises that require users to make numerous choices. It is often very time and energy consuming for users to study and decide what to do with each optimization task proposed by the optimization software. Therefore, it is desirable to have a method of prioritizing and managing optimization tasks in a way that is tailored to the need of every user.

SUMMARY

In accordance with some implementations of the disclosed technology, a method of improving performance of a computing device (e.g., device 500 in FIG. 5) is disclosed. The method comprises: scanning the computing device to generate multiple performance optimization tasks for the computing device; presenting, for user selection, multiple task prioritizing methods for determining relative priority of at least two of the multiple performance optimization tasks; receiving a user's selection of a first task prioritizing method from the multiple task prioritizing methods; in accordance with the first task prioritizing method, identifying a first task with a highest priority among the multiple performance optimization tasks; displaying a first interface including information of the first performance optimization task and an option to start the first performance optimization task; upon receiving the user's instruction to start the first performance optimization task, starting the first performance optimization task; and upon completion of the first performance optimization task, replacing the first interface with a second interface including information of a second performance optimization task with a second highest priority among the multiple performance optimization tasks and an option to start the second performance optimization task.

In another aspect, a device (e.g., device 500 in FIG. 5) comprises one or more processors, memory, and one or more program modules stored in the memory and configured for execution by the one or more processors. The one or more program modules include instructions for performing the method described above. In another aspect, a non-transitory computer readable storage medium having stored thereon instructions, which, when executed by a device, cause the device to perform the method described above. In some embodiments, a computer system (e.g., device 500 in FIG. 5) includes means for performing, or controlling performance of, the operations of any of the methods described herein.

Various advantages of the present application are apparent in light of the descriptions below.

BRIEF DESCRIPTION OF THE DRAWINGS

The aforementioned features and advantages of the application as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In accordance with some embodiments, performance improving software may be run in a user terminal such as a computer, a notebook, a mobile phone, and a tablet computer, and determines optimization tasks suitable for improving a current operating environment of the terminal by scanning the current operating environment of the terminal, and implements optimization on the operating environment of the terminal on software by executing the optimization tasks. The scanning of the terminal includes scanning content such as files and folders at designated positions in the terminal, running processes, registry entries, system startup items, and network traffic, and according to different scanning objectives, determining currently executable optimization tasks corresponding to the scanning objectives.

In accordance with some embodiments, performance optimization tasks include tasks for the purpose of increasing system speed, releasing memory or disk space, reducing system startup, enhancing security, increasing ease of user operation, etc. These tasks may include updating of application versions, adding system patches, cleaning malicious software, cleaning cookies, emptying recycle bin, defragmenting disks, uninstalling unnecessary programs and applications, closing applications, reducing screen brightness, using screen saver, changing power saving policy, closing privacy loophole, synchronizing documents with a another device, managing application authorization, moving files from memory to storage disk, deleting files with little use, managing music, photos and e-books, managing browser add-ons, etc.

Figure 1:
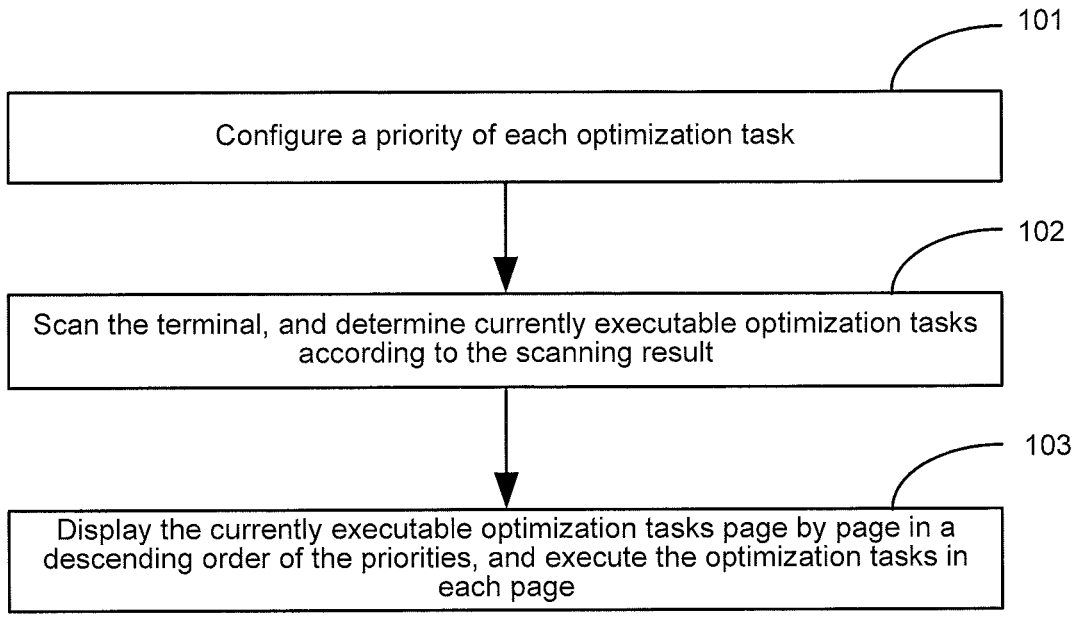
FIG. 1 is a flowchart of a method for optimizing a terminal in accordance with some embodiments.

FIG. 1 shows a flowchart of a method for optimizing an operating environment of a terminal in accordance with some embodiments.

In accordance with some embodiments, in a step 101, the computing device configures a priority of each optimization task according to a level of a terminal problem corresponding to the optimization task, where the optimization task is used for optimizing the operating environment of the terminal.

In some embodiments, each optimization task can solve one or more terminal problems. Take security issues and tasks for example. Security levels are determined for the terminal problems one by one according to severity of terminal security threats. A terminal problem having a higher security level may pose a more severe security threat to the terminal. After the levels of the terminal problems have been determined, according to the level of each terminal problem, a priority of an optimization task that solves the terminal problem is configured. An optimization task that solves a terminal problem having a higher security level has a higher priority.

For example, scanning shows that the terminal has a Trojan virus, which poses high security risk. However, if the scanning shows that the device has too many boot processes, only the boot speed of the terminal is affected. Therefore, by comparison, the security threat of the Trojan virus is severer than that from too many boot processes. Therefore, the priority of the optimization task "Trojan virus isolation" is evidently higher than that of the optimization task "boot speed optimization."

In accordance with some embodiments, in a step 102, the computing device scans a current operating environment of the terminal, and determines currently executable optimization tasks according to the scanning result.

In some embodiments, the currently executable optimization tasks include optimization tasks suitable for improving the current operating environment of the terminal. For example, based on a current scanning result of the terminal, if no suspicious Trojan virus is found in the terminal, the optimization n task of Trojan virus isolation is not included in the currently executable optimization tasks.

In accordance with some embodiments, in a step 103, the computing device displays the currently executable optimization tasks page by page in a descending order of the priorities, and executes the optimization tasks in each page in that order.

For example, the number of the currently executable optimization tasks is 10, the 10 optimization tasks are first arranged in a descending order of priorities of the optimization tasks, and then the 10 optimization tasks are displayed page by page. For example, optimization tasks with the top two priorities are displayed in the first page, optimization tasks with priorities ranked the third and fourth are displayed in the second page, and so on. Optionally, in each page, only one optimization task is displayed.

In some embodiments, the user can select part of the optimization tasks being displayed and the computing device only executes these selected tasks. For example, for boot speed optimization, in consideration of actual demands, the user does not want some frequently used software to be prohibited from being started at boot-up during the boot speed optimization, and the user may skip designation of the optimization task of boot speed optimization.

In some embodiments, some of the tasks may be mandatorily executed without prior input from the user because of the high priority of these tasks. In some embodiments, optimization tasks designated by the user in the current page are executed before a next page is displayed.

Figure 2:
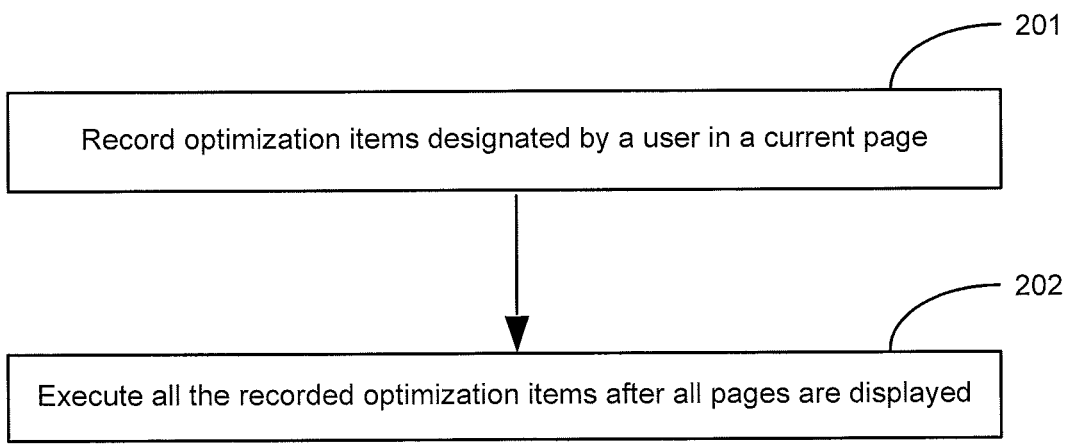
FIG. 2 is a flowchart of a method for optimizing a terminal in accordance with some embodiments.

As shown in FIG. 2, the executing the optimization task in each page includes the following steps.

In accordance with some embodiments, in a step 201, the computing device records the optimization tasks designated by the user.

In accordance with some embodiments, in a step 202, the recorded optimization tasks are executed after all pages being displayed. In some embodiments, optimization tasks designated by the user are recorded sequentially, and after the user browses through all the pages and finishes designation of optimization tasks, all optimization tasks designated by the user are executed. The executions of tasks can be either sequential or synchronous.

In some embodiments, in any step of the whole optimization process, the user can terminate execution of the optimization process.

In accordance with some embodiments, optimization tasks include automatic optimization tasks and manual optimization tasks. The automatic optimization tasks can be executed without requiring a user to further give an operation instruction, for example, buffer space cleaning, recycle bin cleaning, and so on. The manual optimization tasks require user instructions before being executed, for example, uninstall of rarely used software, and the like. In some embodiments, after 102 and before 103, the computing device automatically executes an automatic optimization tasks. In some embodiments, for an automatic optimization task, after currently executable optimization tasks are determined, the user is first requested to give an automatic optimization instruction, and after the automatic optimization instruction is detected, automatic optimization tasks are automatically executed. In some embodiments, only a manual optimization task in the currently executable optimization tasks needs to be displayed page by page in a descending order of the priorities. In some embodiments, optimization tasks are gathered for automatic execution without the designation of the user.

In accordance with some embodiments, after the execution of one optimization task is finished, the back end computes in real time and displays a latest status score according to the execution of the currently executable optimization tasks. By updating a latest status score, the user can learn the progress of executing of the current optimization tasks in time. For example, the score of an optimal status for the terminal is the full score 100. When the performance improving software finishes scanning and obtains that the score of the current status is 60. When tasks are being executed, it is refreshed in real time that the score is constantly increasing and eventually stops at 75 when all tasks are finished. Real-time display of the score enables the user to instruct whether to continue optimization.

Figure 3:
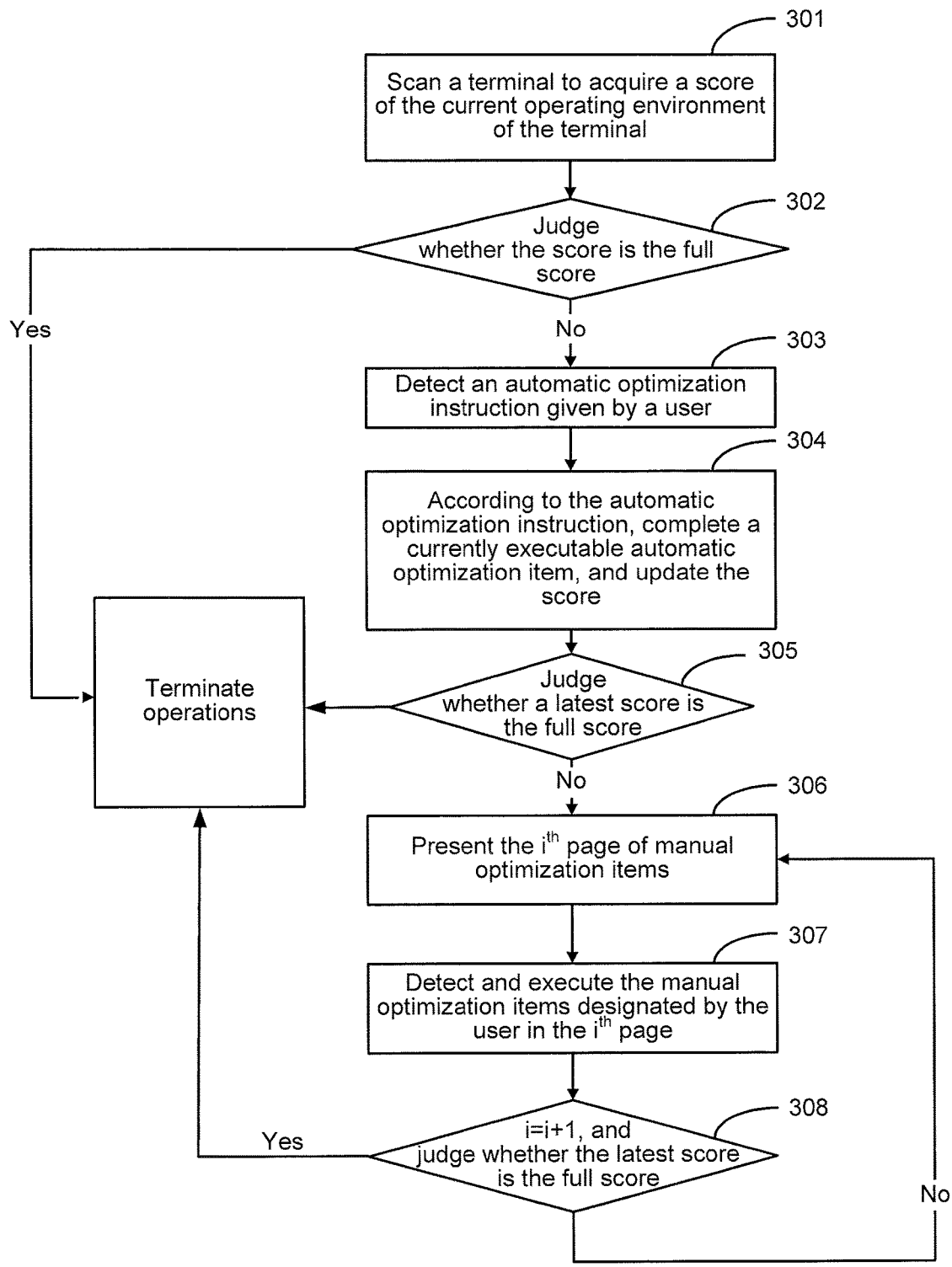
FIG. 3 is a flowchart of a method for optimizing a terminal in accordance with some embodiments.

FIG. 3 shows a specific implementation flow of a method for optimizing a terminal in accordance with some embodiments.

In accordance with some embodiments, in a step 301, the computing device scans the terminal to acquire a status score.

In accordance with some embodiments, in a step 302, the computing device judges whether the score is the full score, if yes, terminates the operation, otherwise, performs 303.

In accordance with some embodiments, in a step 303, the computing device detects an automatic optimization instruction given by a user.

In accordance with some embodiments, in a step 304, according to the automatic optimization instruction, the computing device completes a currently executable automatic optimization task, and refreshes the status score.

In accordance with some embodiments, in a step 305, the computing device judges whether a latest score is the full score, if yes, terminates the operation, and otherwise, perform 306.

In accordance with some embodiments, in a step 306, the computing device presents the $i^{th}$ page of manual optimization task, where i is initialized to be 1.

In accordance with some embodiments, in a step 307, the computing device detects and executes the manual optimization task designated by the user in the $i^{th}$ page.

In accordance with some embodiments, in a step 308, the computing device increase i by one and judges whether the latest score is the full score, if not, the process returns to perform 306, and otherwise, terminate the operation. Therefore, the computing device judges whether the score is the full score every time after executing tasks in one page.

Figure 4:
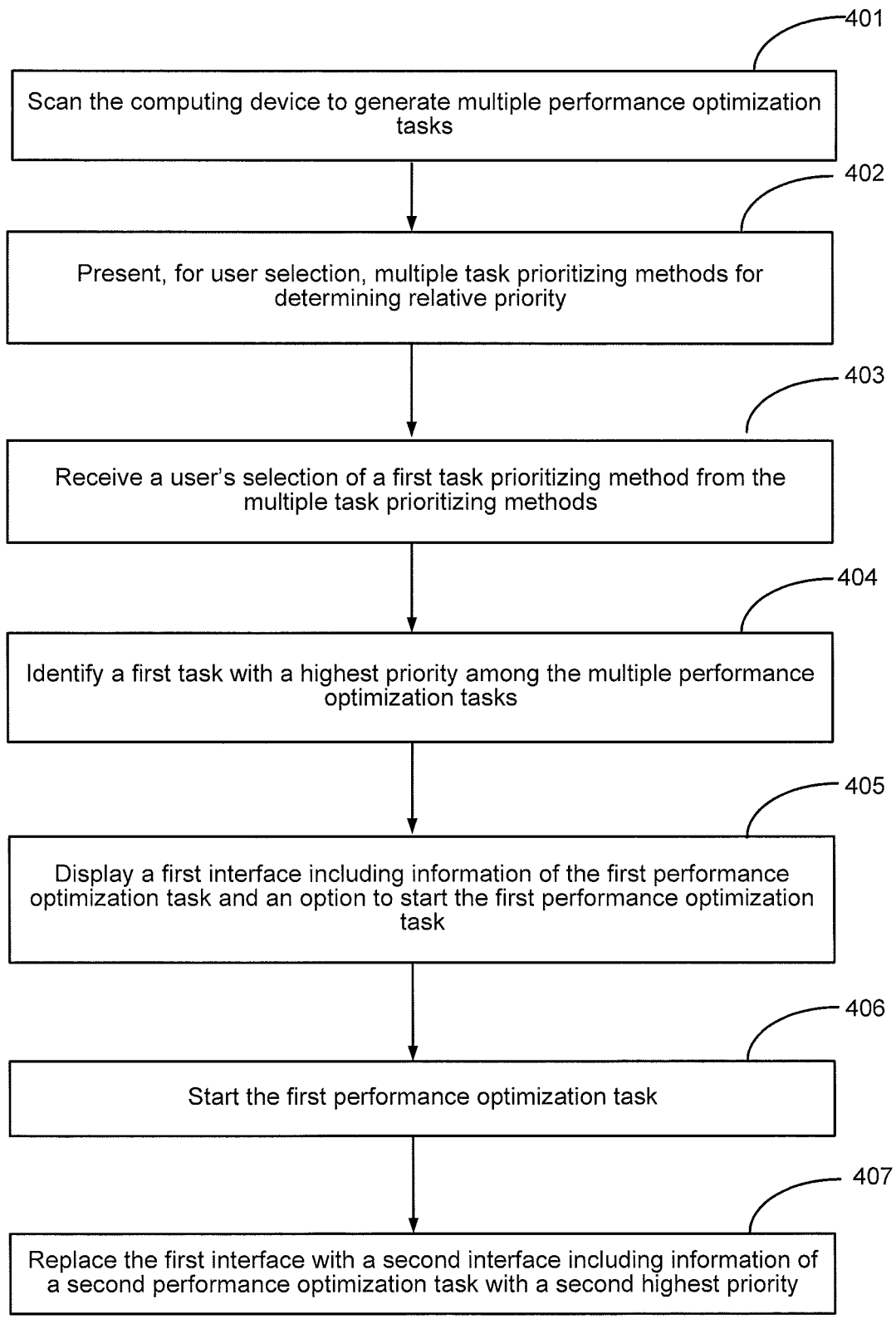
FIG. 4 is a flowchart of a method of improving performance of a computing device in accordance with some embodiments.
Figure 5:
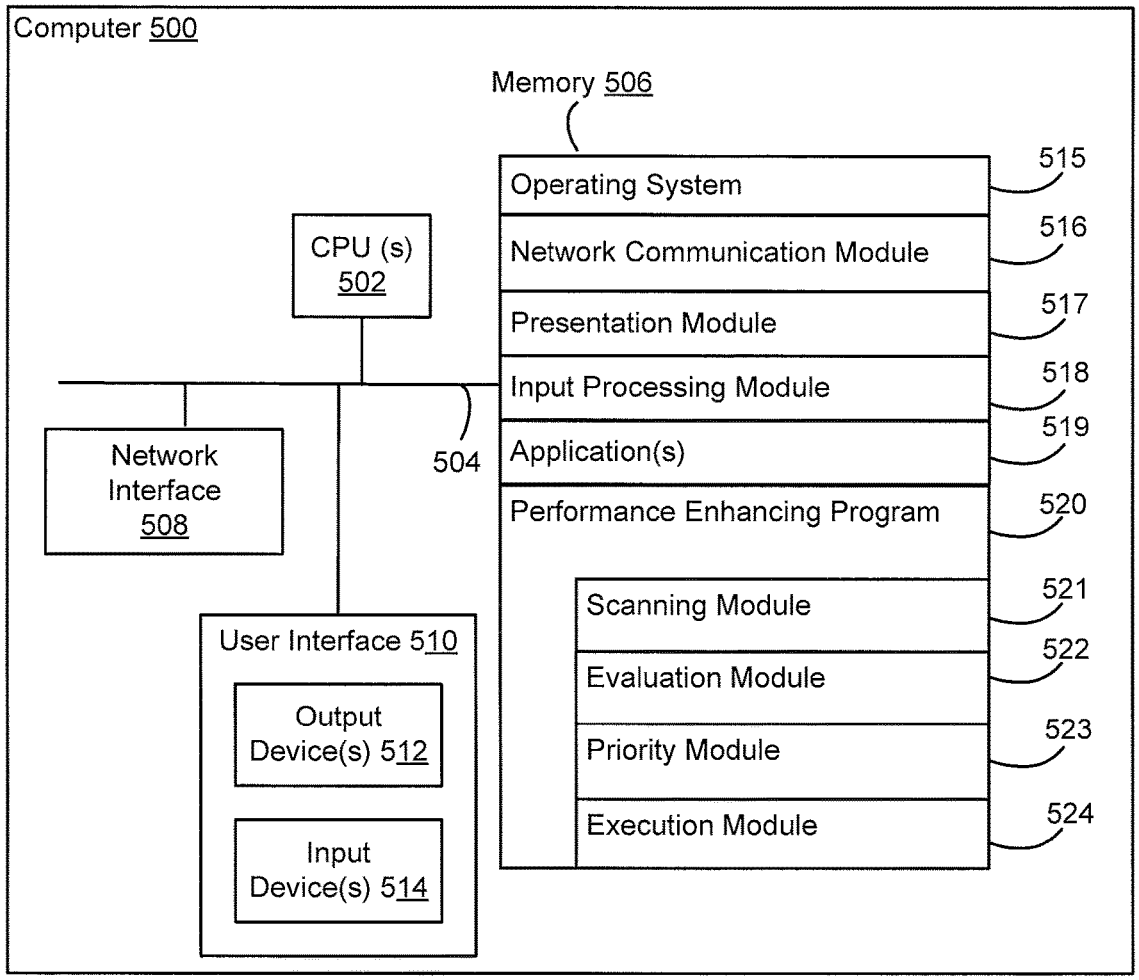
FIG. 5 is a block diagram of an example implementation of a computing device in accordance with some embodiments.
Figure 6:
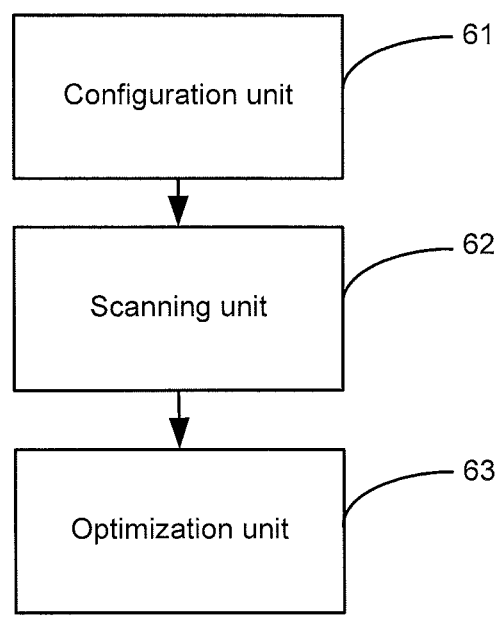
FIG. 6 is a structural block diagram of an apparatus for optimizing an operating environment of a terminal in accordance with some embodiments.

FIG. 4 is a flowchart of a method of improving performance of a computing device in accordance with some embodiments. The computing device has one or more processors and memory for storing one or more programs to be executed by the one or more processors, as shown in FIGS. 5 and 6. FIGS. 7A-7D illustrate user interfaces being displayed by a performance improving application in the process of performing the method.

Figure 7A:
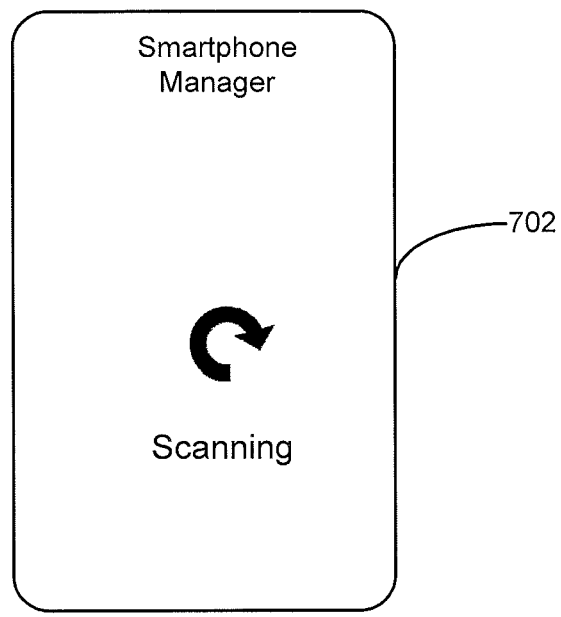
FIGS. 7A-7D illustrate user interfaces presented in a process of optimizing a computing device in accordance with some embodiments.

In accordance with some embodiments, in a step 401, the computing device scans the computing device to generate multiple performance optimization tasks for the computing device. A performance improving application may automatically scan the computing device when starting. In addition, a user may choose different types of scanning: quick scanning, specified scanning, complete scanning, etc. FIG. 7A displays a user interface 702 showing that an application (e.g., Smartphone Manager) is scanning a smart phone.

Figure 7B:
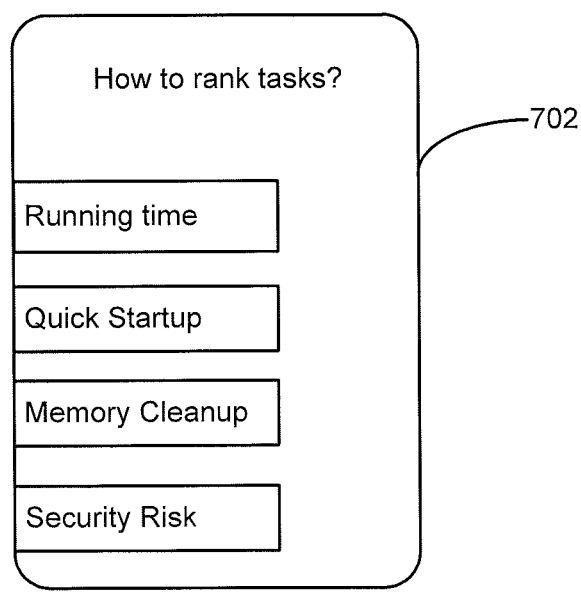

In accordance with some embodiments, in a step 402, the computing device presents, for user selection, multiple task prioritizing methods for determining relative priority of at least two of the multiple performance optimization tasks. For example, a smart phone may displays multiple prioritizing method options (e.g., Running time, Quick Startup, Memory Cleanup, Security Risk, etc.) as shown in FIG. 7B so that a user can choose one of the methods from the displayed user interface 704.

In accordance with some embodiments, before presenting the multiple task prioritizing methods, the computing device starts at least one of the multiple performance optimization tasks meeting predetermined auto-execution criteria, wherein at least one of the multiple performance optimization tasks are not prioritized in accordance with the first task prioritizing method. For example, the computing device may determine that some tasks are urgent, (e.g., posing extreme security threats,) and must be performed immediately.

In accordance with some embodiments, the multiple task prioritizing methods are based on one or more criteria are selected from: projected running time of executing the task, projected time saving for system startup, amount of memory released, power usage reduction, quantified reduced security risk, projected increase of system speed, amount of disk space released, sizes of additional documents to be downloaded, and sizes of documents to be moved, etc.

In accordance with some embodiments, the computing device receives the user's setting of task prioritizing method from the multiple task prioritizing methods beforehand. For example, the user sets a default task prioritizing method and the computing device does not have to present multiple methods for user to choose. In accordance with some embodiments, the computing device displays an interface for choosing a default task prioritizing method; through the interface for choosing the default task prioritizing method, receives the user's choice of a third task prioritizing method as the default task prioritizing method.

In accordance with some embodiments, the user sets a policy that the computing device can automatically perform tasks meeting certain criteria, e.g., meeting a threshold requirement under a task prioritizing method. The computing device sets a threshold of priority in accordance with the default task prioritizing method; and after scanning the computing device to generate the multiple performance optimization tasks, automatically starting one or more performance optimization tasks having priorities higher than the threshold. For example, the automatic performance policy may include that the program automatically execute tasks whose security enhancement level are high and wait for user instructions for the ones whose security enhancement level are medium or low.

In accordance with some embodiments, the user can also create a customized prioritizing method. The computing device receives the user's input of one or more criteria for prioritizing performance optimization tasks and importance of each criterion, and creates a customized task prioritizing method based on the one or more criteria and the importance of each criterion. For example, the user may indicates that the priority should be based on 20% of system starting time, 30% of system running speed, and 50% of security. When there is more than one criterion in a method, the device converts the measurements in multiple different criteria into one uniform measurement. For example, the system may set up a scoring system to convert measurements into scores. Freeing up 500 M memory space may increase the score by 3 while decreasing system startup time by 2 seconds may increase the score by 10. The scoring system then makes various measurements comparable with each others. The scoring system can be set up in optimization programs by designers. As discussed previously, the program can also display the score to inform the user the current status of the terminal.

Sometimes, users not only want to optimize the performance for the computing device in general, but also want the computing device to be good at what the user uses it to do. In some embodiments, the computing device detects activities of the computing devices periodically or continuously; and creates a task prioritizing method including one or more criteria that optimize the performance of the computing devices for the detected activities. For example, if a user often runs a program that uses lots of memory space, then releasing memory space has a high priority. If the user often visits risky websites, the system may enhance the priority of getting all security patches in time.

In accordance with some embodiments, in a step 403, the computing device receives a user's selection of a first task prioritizing method from the multiple task prioritizing methods. In some embodiments, the user uses a mouse to click the intended method. In some embodiments, the user may have previously set a default selection, and the computing device receives the default selection without having to receiving a specific instruction each time.

In accordance with some embodiments, in a step 404, in accordance with the first task prioritizing method, the computing device identifies a first task with a highest priority among the multiple performance optimization tasks.

Different prioritizing methods rank the tasks differently. For example, if a first method ranks tasks by the size of disk space being freed up, then deleting rarely used documents will trump updating programs by the first method. If a second method prioritizes energy saving, then lowering screen light can be preferred over empting recycle bin.

In the case of there are tabs corresponding to tasks, the order of the tabs may correspond to the priority of the tasks. In some embodiments, after receiving a user's selection of a first respective tab, the computing device displays a respective user interface including respective information of the corresponding performance optimization task and an option to start the corresponding performance optimization task of the first respective tab.

In accordance with some embodiments, in a step 405, the computing device displays a first interface including information of the first performance optimization task and an option to start the first performance optimization task.

Figure 7C:
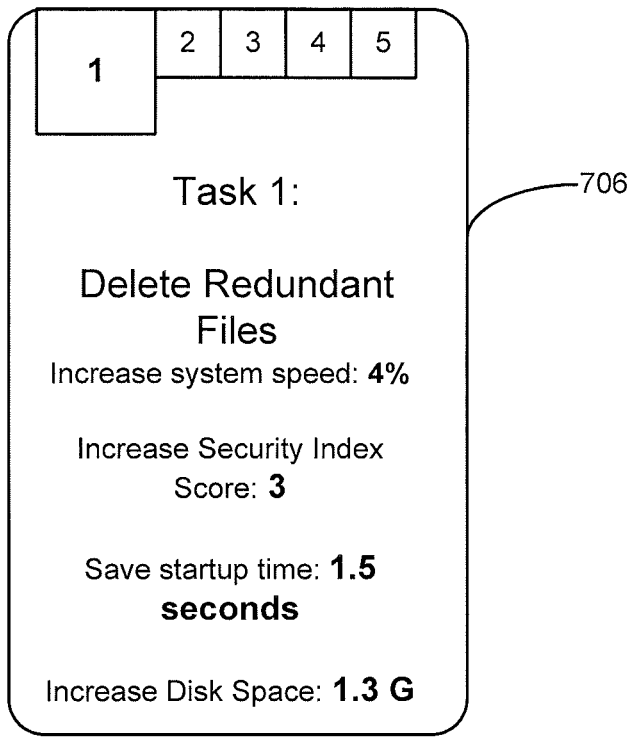

In accordance with some embodiments, after scanning the computing device to generate the multiple performance optimization tasks, the computing device displays multiple tabs, each tab corresponding to one of the at least two of the multiple task prioritizing methods. For example, there are totally five tabs corresponding to five tasks in FIG. 7C. As shown in FIG. 7C, tab 1 is currently highlighted, and task 1 corresponding to tab 1 is presented in the user interface 706 shown in FIG. 7C, while the tasks corresponding to the other tabs are hidden from view.

In accordance with some embodiments, in a step 406, upon receiving the user's instruction to start the first performance optimization task, the computing device starts the first performance optimization task.

Figure 7D:
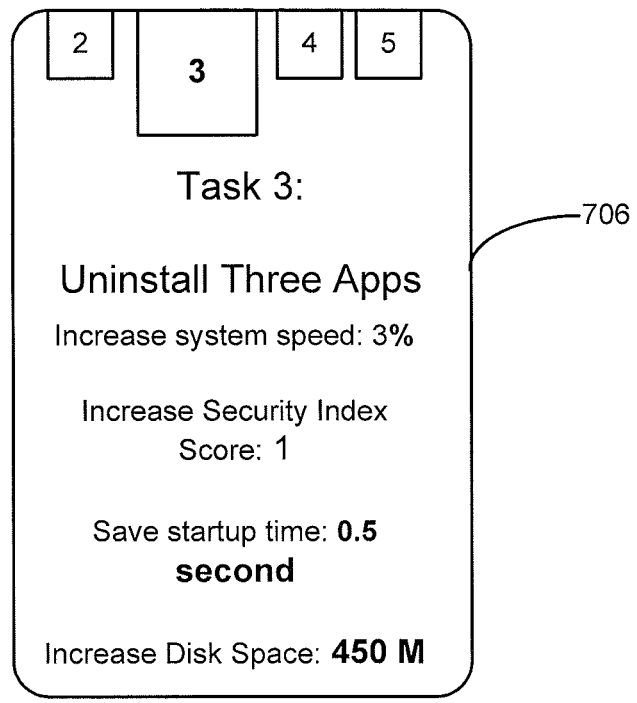

When the first tab corresponds to the first task, after completing the corresponding performance optimization task of the first respective tab, the device ceases to display the first respective tab. For example, FIG. 7D shows that the computing device has completed Task 1 and the user has chosen to view Task 3. Therefore, Tab 1 has disappeared from the user interface 708 and the respective information of Task 3 is shown with the tab 3 highlighted in the user interface 708. If the user had not explicitly selected tab 3, task 2 corresponding to tab 2 will be displayed in the user interface, after the completion of task 1.

The user may also choose to ignore or defer any task. In accordance with some embodiments, the computing device receives the user's instruction to defer the first performance optimization task until predetermined task execution criteria are met. Criteria include a predetermined time, free space of memory, occupation of CPU, etc. The computing device starts the first performance optimization task when the predetermined task execution criteria are met, without further instruction from the user for starting the first performance optimization task. Alternatively, the device reminds the user when the predetermined criteria are met and prompts the user to start the task. For example, the user may set to start an application updating task to a time two hour later, the computing device may automatically start the application updating task at the user specified time.

In accordance with some embodiments, in a step 407, upon completion of the first performance optimization task, the computing device replaces the first interface with a second interface including information of a second performance optimization task with a second highest priority among the multiple performance optimization tasks and an option to start the second performance optimization task.

In accordance with some embodiments, the computing device generates a score for each of the at least two of the multiple performance optimization tasks in accordance with the first task prioritizing method, wherein the respective information of the first and second performance optimization tasks include the respective scores for the first and second performance optimization tasks.

In accordance with some embodiments, the computing device may employ various means to display the progress of finishing tasks to inform and motivate users. For example, the computing devices may display a progress bar, a total score or a completion percentage to show progress of finishing the at least two of the multiple performance optimization tasks. The computing device may update the progress bar, score or completion percentage after finishing each task. In accordance with some embodiments, the progress is measured by one or more criteria including: number of finished performance optimization tasks, length of time of finished performance optimization tasks, total saved time of system startup, sizes of memory space released for use, power usage reduction, quantified security risk reduction, increase of system speed, sizes of disk space released for use, sizes of additional documents to be downloaded, sizes of documents moved, and scores of finished performance optimization tasks. In some embodiments, the progress is measured in a manner corresponding to the first task prioritizing method. For example, if the method prioritizing tasks are based on the system speed, then progress is measured by the amount of speed increased by each task. If the method is based on security, then progress is measured by the predetermined security benefit brought by each task.

FIG. 5 is a diagram of an example implementation of a computing device 500 in accordance with some embodiments. While certain specific features are illustrated, those skilled in the art will appreciate from the present disclosure that various other features have not been illustrated for the sake of brevity and so as not to obscure more pertinent aspects of the implementations disclosed herein. Computing device 500, typically, includes one or more processing units (CPUs) 502, one or more network interfaces 508, memory 506, and one or more communication buses 504 for interconnecting these components (sometimes called a chipset). Computing device 500 also includes a user interface 510. User interface 510 includes one or more output devices 512 that enable presentation of media content, including one or more speakers and/or one or more visual displays. User interface 510 also includes one or more input devices 514, including user interface components that facilitate user input such as a keyboard, a mouse, a voice-command input unit or microphone, a touch screen display, a touch-sensitive input pad, a gesture capturing camera, or other input buttons or controls. Furthermore, some computing devices 500 use a microphone and voice recognition or a camera and gesture recognition to supplement or replace the keyboard. Memory 506 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 506, optionally, includes one or more storage devices remotely located from one or more processing units 502. Memory 506, or alternatively the non-volatile memory within memory 306, includes a non-transitory computer readable storage medium.

In some implementations, memory 506, or the non-transitory computer readable storage medium of memory 506, stores the following programs, modules, and data structures, or a subset or superset thereof:
- operating system 515 including procedures for handling various basic system services and for performing hardware dependent tasks;
- network communication module 516 for connecting computing device 500 to other computing devices (e.g., a server) connected to one or more networks via one or more network interfaces 508 (wired or wireless);
- presentation module 517 for enabling presentation of information (e.g., a user interface for application(s) 519, widgets, websites and webpages thereof, and/or games, audio and/or video content, text, etc.) at computing device 500 via one or more output devices 512 (e.g., displays, speakers, etc.) associated with user interface 510;
- input processing module 518 for detecting one or more user inputs or interactions from one of the one or more input devices 514 and interpreting the detected input or interaction;
- one or more applications 519 for execution by computing device 500 (e.g., games, application marketplaces, payment platforms, and/or other web or non-web based applications); and
- performance enhancing program 520 for implementing the method for improving performance of the computing device as described herein.

In accordance with some embodiments, the performance enhancing program 520 is configured to enhance the performance of the computing device 500. The performance enhancing program 520 includes a scanning module 521, an evaluation module 522, a priority module 523, and an execution module 524. The scanning module 521 is configured to scan the computing device 500 and identify optimization tasks. The evaluation module 522 is configured to evaluate every task in accordance with various criteria, including how much improvement and downside the task may bring in accordance with each criterion. For example, an evaluation of a task of installing security patches may show that the task takes five minutes, taking up 220 M disk space, slowing down system startup by 0.3 second, increasing the security of the system by a score of 5, etc. The priority module 523 is configured to create and select the methods of prioritize of tasks and rank the tasks in accordance with a selected method and evaluation results of all tasks. The execution module 524 is configured to execute tasks by the order of the priority or the instruction of the user.

FIG. 6 is a structural block diagram of an apparatus for optimizing an operating environment of a terminal in accordance with some embodiments. The apparatus may be located in a terminal such as a mobile phone, a computer, a tablet computer, and a notebook and is used for executing the method for optimizing an operating environment of a terminal. For ease of description, only parts relevant to this embodiment are shown.

In accordance with some embodiments, the apparatus includes: a configuration unit 61, configuring a priority of each optimization task; a scanning unit 62, scanning the terminal, and determining currently executable optimization tasks; and an optimization unit 63, displaying the currently executable optimization tasks page by page in a descending order of the priorities, and executing the optimization tasks.

In some embodiments, the apparatus further includes an automatic optimization unit, automatically executing an automatic optimization task in the currently executable optimization tasks.

In some embodiments, the optimization unit 63 is used for displaying the manual optimization task in the currently executable optimization tasks.

Optionally, the optimization unit 63 is used for executing the optimization tasks designated by the user in each page, and specifically, executing the optimization tasks designated by the user.

Optionally, the optimization unit 63 includes a recording subunit, recording the optimization tasks designated by the user; and an optimization sub-unit, executing the recorded optimization tasks after all pages are displayed.

Optionally, the apparatus further includes a scoring unit, computing and displaying a latest status score each time the execution of one of the optimization tasks is finished.

The above descriptions are merely preferred embodiments but are not intended to limit the present application. Any changes, equivalent replacements or improvements made within the spirit and principle of the present application shall fall within the protection scope of the present application.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the application to the precise forms disclosed. Many modifications and variations are possible in diagram of the above teachings. The embodiments were chosen and described in order to best explain the principles of the application and its practical applications, to thereby enable others skilled in the art to best utilize the application and various embodiments with various modifications as are suited to the particular use contemplated.

What is claimed is:

1. A method of improving performance of a mobile phone, the mobile phone having one or more processors and memory for storing one or more programs to be executed by the one or more processors, and the method comprising:
   first scanning the mobile phone to generate a status score, multiple automatic performance optimization tasks, and multiple manual performance optimization tasks, wherein the status score indicates a current level of optimization of applications running on the mobile phone;
   in response to determining that the status score is less than a predefined threshold:
      performing the multiple automatic performance optimization tasks; and
      second scanning the mobile phone to determine an updated status score of the mobile phone;
   in response to determining that the updated status score is still less than the full score:
      presenting, for user selection, a user interface including multiple task prioritizing methods for determining relative priority of at least two of the multiple manual performance optimization tasks;
      receiving, through the user interface, a user's selection of a first task prioritizing method from the multiple task prioritizing methods;
      ranking the multiple manual performance optimization tasks by their respective priorities in accordance with the first task prioritizing method, and identifying a first manual performance optimization task with a highest priority among the multiple manual performance optimization tasks;
      displaying a first interface including information of the first manual performance optimization task and an option to start the first manual performance optimization task;
      upon receiving the user's instruction to start the first manual performance optimization task, starting the first manual performance optimization task; and
      upon completion of the first manual performance optimization task, replacing the first interface with a second interface including information of a second manual performance optimization task with a second highest priority among the multiple manual performance optimization tasks in replacement of the first manual performance optimization task and an option to start the second manual performance optimization task.

2. The method of claim 1, wherein the multiple task prioritizing methods are based on one or more criteria selected from: projected running time for each manual performance optimization task, projected time saving for system startup, amount of memory released, power usage reduction, quantified reduced security risk, projected increase of system speed, amount of disk space released, sizes of additional documents to be downloaded, and sizes of documents to be moved.

3. The method of claim 1, further comprising:
   generating a score for each of the at least two of the multiple manual performance optimization tasks in accordance with the first task prioritizing method, wherein the respective information of the first and second manual performance optimization tasks includes the respective scores for the first and second manual performance optimization tasks.

4. The method of claim 1, further comprising:
   receiving the user's instruction to defer the first manual performance optimization task until predetermined task execution criteria are met; and
   starting the first manual performance optimization task when the predetermined task execution criteria are met, without further instruction from the user for starting the first manual performance optimization task.

5. The method of claim 1, further comprising:
   before presenting the multiple task prioritizing methods, starting at least one of the multiple manual performance optimization tasks meeting predetermined auto-execution criteria, wherein at least one of the multiple performance optimization tasks are not prioritized in accordance with the first task prioritizing method.

6. The method of claim 1, further comprising:
   after scanning the mobile phone to generate the multiple manual performance optimization tasks, displaying multiple tabs, each tab corresponding to one of the at least two of the multiple task prioritizing methods;
   after receiving a user's selection of a first respective tab, displaying a respective user interface including respective information of the corresponding manual performance optimization task and an option to start the corresponding manual performance optimization task of the first respective tab; and
   after completing the corresponding performance optimization task of the first respective tab, ceasing to display the first respective tab.

7. The method of claim 1, further comprising:
   monitoring one or more predetermined activities of the mobile phone periodically or continuously; and
   creating a task prioritizing method including one or more criteria that optimize the performance of the mobile phone for the monitored activities.

8. A mobile phone, comprising:
   one or more processors; and
   memory storing one or more programs for execution by the one or more processors, the one or more programs including instructions for:
   first scanning the mobile phone to generate a status score, multiple automatic performance optimization tasks, and multiple manual performance optimization tasks, wherein the status score indicates a current level of optimization of applications running on the mobile phone;
   in response to determining that the status score is less than a predefined threshold:
      performing the multiple automatic performance optimization tasks; and
      second scanning the mobile phone to determine an updated status score of the mobile phone;
   in response to determining that the updated status score is still less than the full score:
      presenting, for user selection, a user interface including multiple task prioritizing methods for determining relative priority of at least two of the multiple manual performance optimization tasks;
      receiving, through the user interface, a user's selection of a first task prioritizing method from the multiple task prioritizing methods;
      ranking the multiple manual performance optimization tasks by their respective priorities in accordance with the first task prioritizing method, and identifying a first manual performance optimization task with a highest priority among the multiple manual performance optimization tasks;

displaying a first interface including information of the first manual performance optimization task and an option to start the first manual performance optimization task;

upon receiving the user's instruction to start the first manual performance optimization task, starting the first manual performance optimization task; and upon completion of the first manual performance optimization task, replacing the first interface with a second interface including information of a second manual performance optimization task with a second highest priority among the multiple manual performance optimization tasks in replacement of the first manual performance optimization task and an option to start the second manual performance optimization task.

9. The mobile phone of claim 8, wherein the multiple task prioritizing methods are based on one or more criteria selected from: projected running time for each manual performance optimization task, projected time saving for system startup, amount of memory released, power usage reduction, quantified reduced security risk, projected increase of system speed, amount of disk space released, sizes of additional documents to be downloaded, and sizes of documents to be moved.

10. The mobile phone of claim 8, further comprising:
generating a score for each of the at least two of the multiple manual performance optimization tasks in accordance with the first task prioritizing method, wherein the respective information of the first and second manual performance optimization tasks includes the respective scores for the first and second manual performance optimization tasks.

11. The mobile phone of claim 8, further comprising:
receiving the user's instruction to defer the first performance optimization task until predetermined task execution criteria are met; and
starting the first manual performance optimization task when the predetermined task execution criteria are met, without further instruction from the user for starting the first performance optimization task.

12. The mobile phone of claim 8, further comprising:
before presenting the multiple task prioritizing methods, starting at least one of the multiple manual performance optimization tasks meeting predetermined auto-execution criteria, wherein at least one of the multiple performance optimization tasks are not prioritized in accordance with the first task prioritizing method.

13. The mobile phone of claim 8, further comprising:
after scanning the mobile phone to generate the multiple manual performance optimization tasks, displaying multiple tabs, each tab corresponding to one of the at least two of the multiple task prioritizing methods;
after receiving a user's selection of a first respective tab, displaying a respective user interface including respective information of the corresponding manual performance optimization task and an option to start the corresponding manual performance optimization task of the first respective tab; and
after completing the corresponding performance optimization task of the first respective tab, ceasing to display the first respective tab.

14. The mobile phone of claim 8, further comprising:
monitoring one or more predetermined activities of the mobile phone periodically or continuously; and creating a task prioritizing method including one or more criteria that optimize the performance of the mobile phone for the monitored activities.

15. A non-transitory computer readable storage medium having instructions stored thereon, the instructions, when executed by one or more processors of a mobile phone, cause the processors to perform operations comprising:
first scanning the mobile phone to generate a status score, multiple automatic performance optimization tasks, and multiple manual performance optimization tasks, wherein the status score indicates a current level of optimization of applications running on the mobile phone;
in response to determining that the status score is less than a predefined threshold:
performing the multiple automatic performance optimization tasks; and
second scanning the mobile phone to determine an updated status score of the mobile phone;
in response to determining that the updated status score is still less than the full score:
presenting, for user selection, a user interface including multiple task prioritizing methods for determining relative priority of at least two of the multiple manual performance optimization tasks;
receiving, through the user interface, a user's selection of a first task prioritizing method from the multiple task prioritizing methods;
ranking the multiple manual performance optimization tasks by their respective priorities in accordance with the first task prioritizing method, and identifying a first manual performance optimization task with a highest priority among the multiple manual performance optimization tasks;
displaying a first interface including information of the first manual performance optimization task and an option to start the first manual performance optimization task;
upon receiving the user's instruction to start the first manual performance optimization task, starting the first manual performance optimization task; and
upon completion of the first manual performance optimization task, replacing the first interface with a second interface including information of a second manual performance optimization task with a second highest priority among the multiple manual performance optimization tasks in replacement of the first manual performance optimization task and an option to start the second manual performance optimization task.

16. The non-transitory computer readable storage medium of claim 15, wherein the multiple task prioritizing methods are based on one or more criteria selected from: projected running time for each manual performance optimization task, projected time saving for system startup, amount of memory released, power usage reduction, quantified reduced security risk, projected increase of system speed, amount of disk space released, sizes of additional documents to be downloaded, and sizes of documents to be moved.

17. The non-transitory computer readable storage medium of claim 15, further comprising:
generating a score for each of the at least two of the multiple manual performance optimization tasks in accordance with the first task prioritizing method, wherein the respective information of the first and second manual performance optimization tasks includes the respective scores for the first and second manual performance optimization tasks.

18. The non-transitory computer readable storage medium of claim 15, further comprising:
   receiving the user's instruction to defer the first manual performance optimization task until predetermined task execution criteria are met; and
   starting the first manual performance optimization task when the predetermined task execution criteria are met, without further instruction from the user for starting the first performance optimization task.

19. The non-transitory computer readable storage medium of claim 15, further comprising:
   before presenting the multiple task prioritizing methods, starting at least one of the multiple manual performance optimization tasks meeting predetermined auto-execution criteria, wherein at least one of the multiple performance optimization tasks are not prioritized in accordance with the first task prioritizing method.

20. The non-transitory computer readable storage medium of claim 15, further comprising:
   after scanning the mobile phone to generate the multiple manual performance optimization tasks, displaying multiple tabs, each tab corresponding to one of the at least two of the multiple task prioritizing methods;
   after receiving a user's selection of a first respective tab, displaying a respective user interface including respective information of the corresponding manual performance optimization task and an option to start the corresponding manual performance optimization task of the first respective tab; and
   after completing the corresponding performance optimization task of the first respective tab, ceasing to display the first respective tab.

* * * * *